May 9, 1950 — C. R. BEELER — 2,506,914
SELF-LOADING DUMP TRUCK
Filed June 14, 1948 — 4 Sheets-Sheet 2

Clay R. Beeler
INVENTOR,
BY
Bernard P. Miller
ATTORNEY

May 9, 1950   C. R. BEELER   2,506,914
SELF-LOADING DUMP TRUCK
Filed June 14, 1948   4 Sheets-Sheet 3

Clay R. Beeler
INVENTOR,

BY
Bernard P. Miller
ATTORNEY

May 9, 1950     C. R. BEELER     2,506,914
SELF-LOADING DUMP TRUCK
Filed June 14, 1948     4 Sheets-Sheet 4
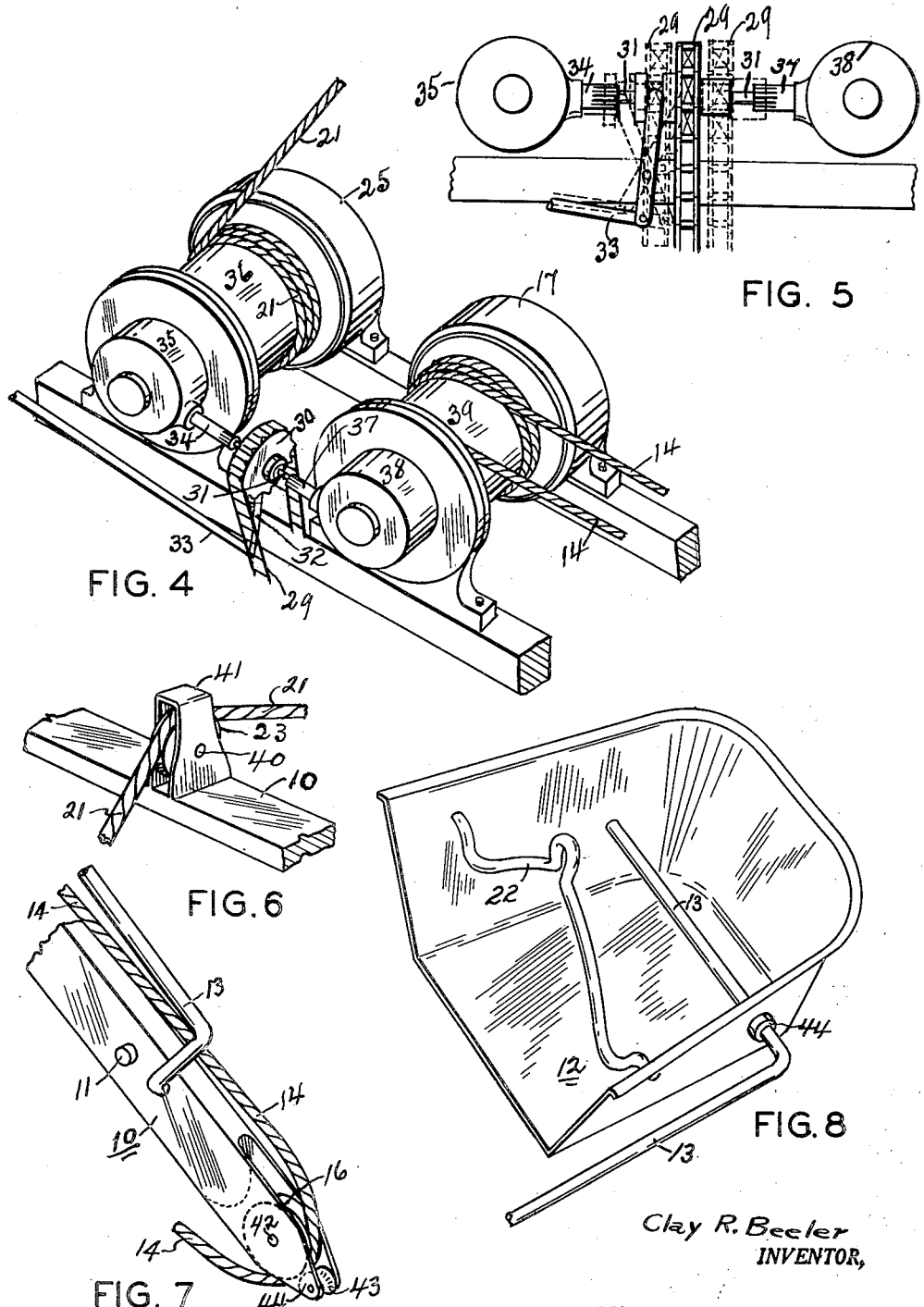
Clay R. Beeler
INVENTOR,
BY
Bernard P. Miller
ATTORNEY Patented May 9, 1950

2,506,914

UNITED STATES PATENT OFFICE 2,506,914

SELF-LOADING DUMP TRUCK

Clay R. Beeler, Oklahoma City, Okla.

Application June 14, 1948, Serial No. 32,779

6 Claims. (Cl. 214—78)

My invention relates to improvements in dump truck loading equipment, more particularly to a device which is operable by the driver of a dump truck.

The prime object of the invention is to provide facilities for the loading of dump trucks, by the driver of the truck.

Another object is to provide a means of loading dump trucks without the use of any outside apparatus.

A further object is to provide a self-loading and self-dumping truck which is operable from the driver's seat.

Other objects will be apparent from the following description when taken in conjunction with the accompanying four sheets of drawings, wherein:

Figure 3 is a fragmentary side elevational view, in dotted lines showing the rear end of a conventional dump truck, and showing in solid lines, the position occupied by the loading device when ready to load, and with its loading movement being illustrated dotted-in.

Figure 4 is a perspective view of a double winch mechanism for operating the loading device;

Figure 5 is a side elevational view of the winch drive chain and selective clutch;

Figure 6 is a fragmentary perspective view, detailing one of the cable guides or guards;

Figure 7 is a perspective of the cable and sheave located at the lower end of the loading device side arm; and, Figure 8 is a perspective view of the loading scoop.

Like characters of reference indicate like parts in all the figures wherein they occur.

In the drawings:

Figure 2:
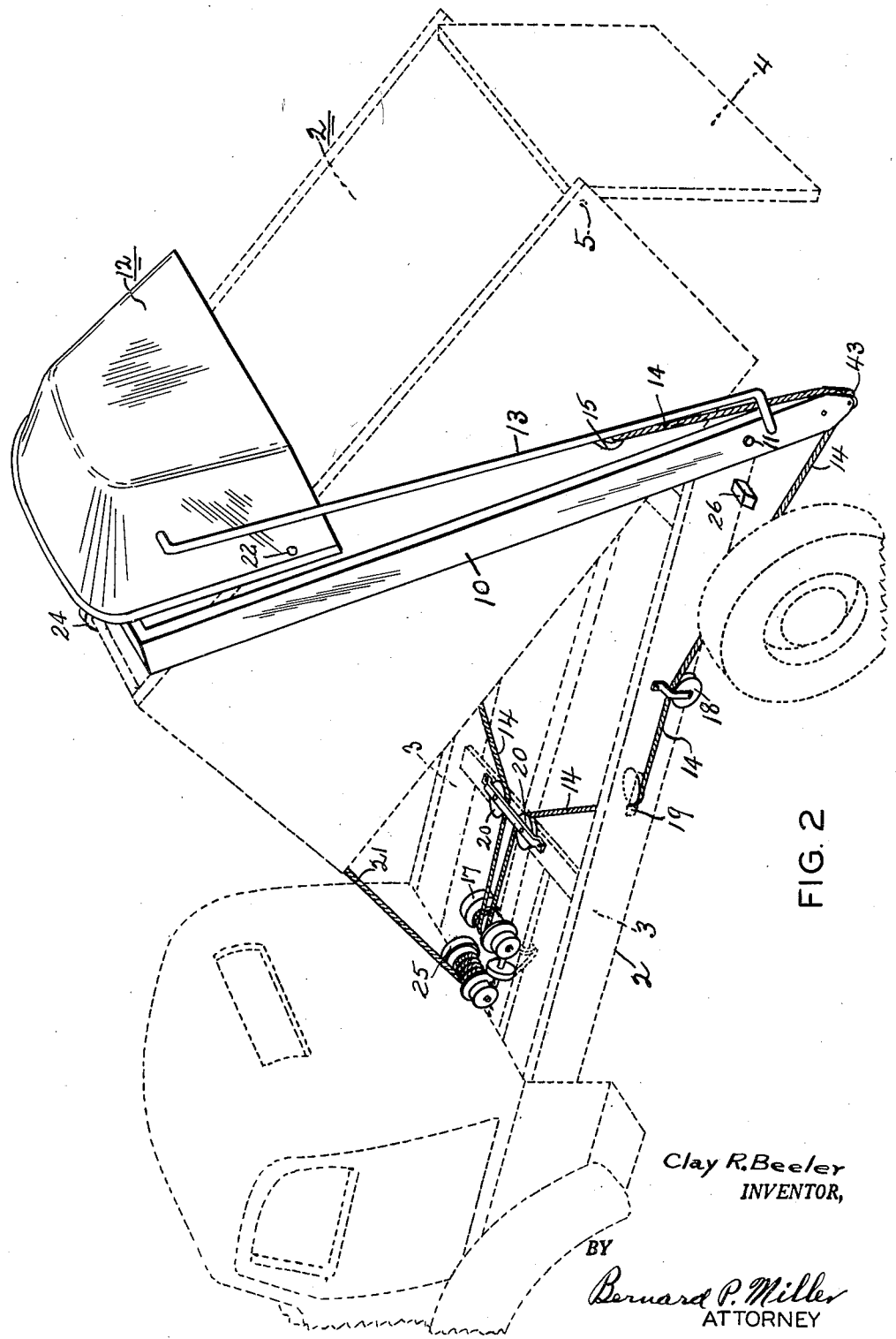
Figure 2 is a similar view, in dotted lines showing the dump truck in dumping position, and in solid lines, showing the relative position occupied by the loading device.

The reference numeral 1 indicates as a whole a conventional dump truck chassis, drawn in dotted lines, and showing the relation of the invention to such chassis and to a conventional dump body 2, operatively mounted thereon. The dump body 2, mounted on the usual truck chassis beams 3, is used as a container for transporting earth, sand, gravel or other substance, and the body 2 is equipped with an end-gate or rear wall 4 which is hinged at its top on opposite sides of the body by a hinge-pin 5. When the conventional dump body unloading mechanism is put in motion, it may raise the dump body to the unloading position, as shown in Figure 2, the weight of the contents then acting to force the end-gate 4 outwardly at the bottom. This swinging movement of the end-gate allows the load in the dump truck body to slide out at the rear of the truck.

Reference numeral 10 indicates the two parallel side arms of an inverted U-shaped arch or arbor. The arms are each attached near their ends to the chassis beams 3 by a hinge-pin 11. A loading scoop 12 is pivotally attached to the side arms 10 by a pair of lifting rods 13 which are also pivotally connected to the scoop. Two cables 14 are attached to eyes 15 on rods 13, and each cable is threaded through a sheave 16 in the end of the side arm 10. The cables 14 lead forwardly from the sheaves 16 to the drum of a loading winch 17, and in so doing, the cables pass through guide sheaves 18, 19 and 20, as best illustrated in Figure 2. Another cable 21 is attached to an eye in a scoop lifting rod 22, and leads through a sheave 23 which is mounted on the top of the cross-member of the arbor, and the cable 21 thereafter passes over a sheave 24 which is mounted on the forward end of the dump body 2, from where it extends to the drum of a lifting winch 25.

Figure 3:
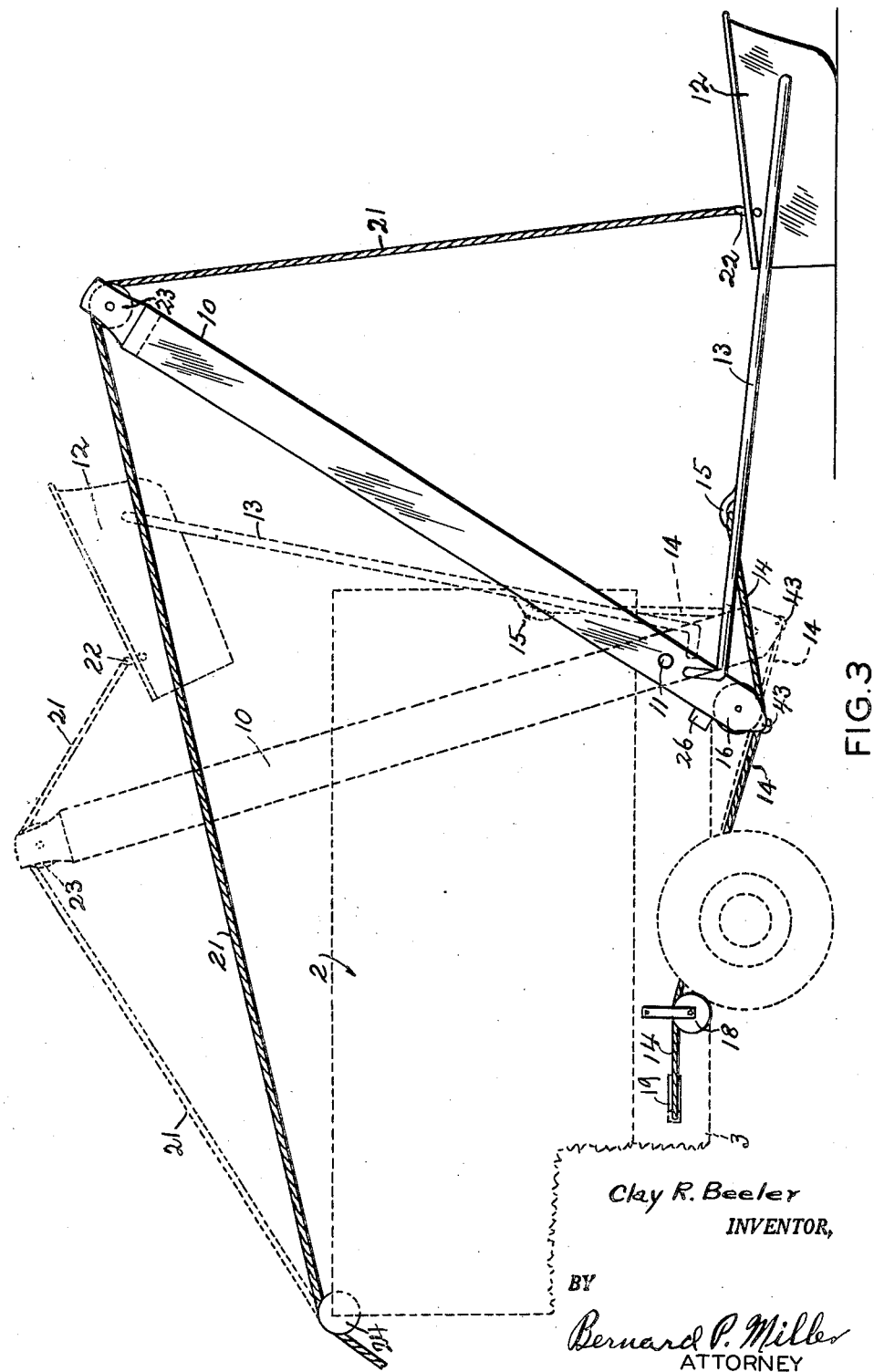

In normal operation of the invention, the truck driver places the truck in the position to be driven forward over the dirt to be loaded into the truck. The driver then power-engages the loading winch 17 so that the cables 14 swing the scoop 12 upwardly and then downwardly to the rear of the truck body, and dispose the scoop upon the ground in the rear of the truck. During this operation, the winch 25 is allowed free rotation so that the cable 21 may unspool, as necessary, as the scoop is lowered to the ground. The side arms 10 are held at an angle by a pair of stops 26 attached to the truck beams 3. The truck is then driven forwardly, until the scoop becomes filled. When the scoop is filled, the driver power-engages the lifting winch 25, and the cable 21 then picks up scoop 2, and raises it to a dumping position over the truck body, at which position the contents slides into the dump body. This position of the scoop is best illustrated by dotted lines in Figure 3.

Figure 1:
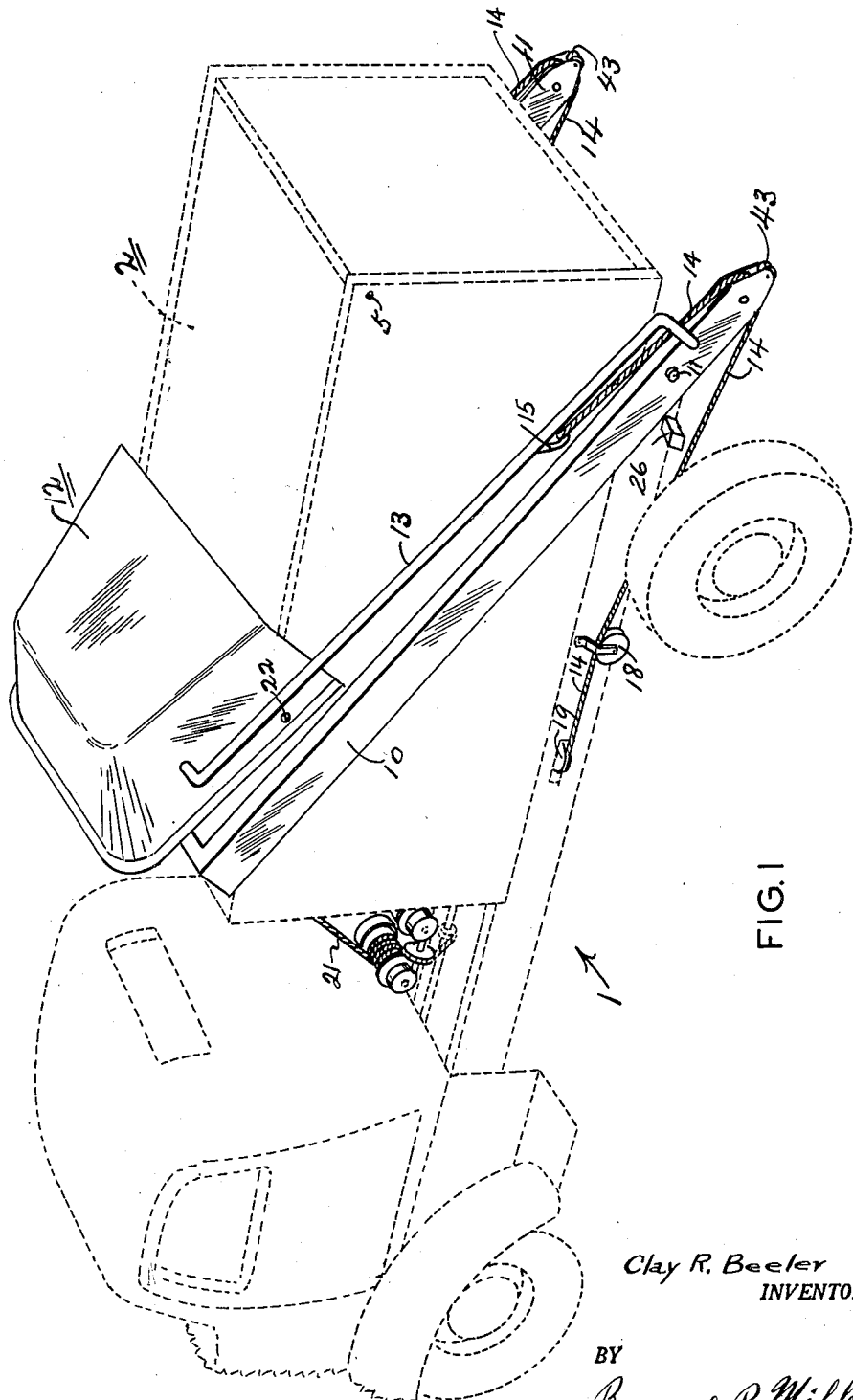
Figure 1 is a fragmentary three quarter rear perspective view, showing a dump truck and chassis in dotted lines, and showing in solid lines, the self-loading device in folded or carrying position.

When the dump body is finally loaded, the scoop and side arms are pulled forward by the cable 21, and the scoop comes to rest on the forward end of the dump body as shown in Figure 1.

Figure 4 shows two conventional winches 17 and 25, mounted on the truck chassis at the rear of the cab. The winches are mounted one behind the other, and are selectively clutch-driven from the truck motor by a chain 29 operating over a sprocket 30 which is slidably mounted on a shaft 31. By manually moving the yoke 32 by use of a lever 33, the sprocket 30 may be slid forward to engage a mating splined shaft 34 which extrudes from a gear train, not shown, but which is enclosed in a housing 35. The gear train is adapted to deliver the proper power and speed ratio to operate the drum 36 on the winch 25. In a similar manner, the yoke 32 may move the sprocket 30 to the rear, and thereby engage a mating-splined shaft 37 which constitutes a part of a gear train, not shown, but which is enclosed in a housing 38. This gear train is properly geared to operate drum 39 of winch 17. This selective action is best illustrated by dotted lines in Figure 5. Invention is not predicated with relation to the winches or to the clutch operation. A conventional type is shown and described in order to illustrate the operability of the invention.

The cable 21 is threaded over sheave 23 which is journaled on a pin 40, in a sheave housing 41 which is rigidly mounted on the cross-member of the arbor, as best illustrated in Figure 6.

Figure 7 shows the lower end of one of the side arms 10, and illustrates that the end is bifurcated to admit the sheave 16. The sheave is journaled on a pin 42. A roller cable guard 43 is held in place by a pin 44 in the end of the side arm 10, so as to hold the cable 14 in position when the scoop is being lowered or raised.

The rods 13 are attached to scoop 12 by running through the sides of the scoop, and the scoop is held in a freely pivoting position, by clamps 44 on rods at each side of the scoop, as best shown in Figure 8. The rods 13 may, if desired, be attached to the exterior of scoop by suitable brackets, not shown, in order to facilitate production. The rods 13 should be attached on the scoop at the proper point of balance to cause the scoop to swing free, and with the open or cutting edge of the scoop residing slightly to the rear of the pivot point, after the load is dumped. This is desirable in order that, as the scoop is pulled forward to its carried position, it will come to rest in an inverted position on the truck body, as shown in Figure 1. The scoop lifting rod 22 is pivotally attached at each end to the sides of the scoop and formed somewhat as shown, or in a similar fashion, to allow the top sides of truck body to be partly between the sides of the scoop, when the scoop is in carried position, as shown in Figure 1.

Obviously the inventive principle could well be followed in structure not identical to that shown in the drawings and described herein, without materially impairing the practicability thereof, and I therefore do not wish to be confined to only the structure shown and described herein, further than I am limited by the scope of the appended claims.

I claim:

1. The combination with a truck chassis having a tipple-type rearwardly emptying dump body thereon, and with power driven winches operatively mounted on said chassis, of: an arbor having its two side legs pivoted to the rear of the chassis on horizontal axis, whereby the end portions of the legs project below said axis, and whereby the closed end of the arbor may swing vertically from a rearwardly projecting position to a forward position of repose upon said dump body; a bail having each of its legs pivotally connected on a horizontal axis to one of the downwardly projecting ends of the arbor; a scoop pivotally carried between the other ends of said bail legs and adapted to swing on a horizontal axis; a sheave-mounted cable extending from one of said winches to the arbor for swinging the same; and a second sheave-mounted cable extending from the other winch to the bail for swinging the same.

2. The combination with a truck chassis having a tipple-type rearwardly emptying dump body thereon, and with power driven winches operatively mounted on said chassis, of: an arbor having its two side legs pivoted to the rear of the chassis on horizontal axis, whereby the end portions of the legs project below said axis, and whereby the closed end of the arbor may swing vertically from a rearwardly projecting position to a forward position of repose upon said dump body; a bail having each of its legs pivotally connected on a horizontal axis to one of the downwardly projecting ends of the arbor; a scoop pivotally carried between the other ends of said bail legs and adapted to swing on a horizontal axis; a sheave operatively mounted on the downwardly projecting end portion of an arbor leg; a cable having one end anchored the bail leg above the arbor leg axis, extending downwardly along the arbor leg, and passing under the sheave, the other end of said cable being connected to one of said winches, whereby a pull on the cable by the winch acts to swing the lower end of the arbor leg forwardly to swing the arbor from a forward to a rearward projecting position; and a stop for limiting rearward movement of the arbor.

3. The combination with a truck chassis having a tipple-type rearwardly emptying dump body thereon, and with power driven winches operatively mounted on said chassis, of: an arbor having its two side legs pivoted to the rear of the chassis on horizontal axis, whereby the end portions of the legs project below said axis, and whereby the closed end of the arbor may swing vertically from a rearwardly projecting position to a forward position of repose upon said dump body; a bail having each of its legs pivotally connected on a horizontal axis to one of the downwardly projecting ends of the arbor; a scoop pivotally carried between the other ends of said bail legs and adapted to swing on a horizontal axis; a sheave operatively mounted on the upper portion of the arbor; a cable extending from one of the winches, passing over the sheave, and having its end anchored to the scoop, whereby a pull on the cable by the winch will simultaneously swing the scoop and bail upwardly from a prone position upon the ground behind the truck into contact with the arbor when the arbor is in a rearwardly projecting position, and whereby a further pull on the cable will simultaneously swing the arbor and scoop forwardly into a position of repose upon said dump-body, and with the scoop in load dumping position.

4. A loading attachment for motor vehicles having a chassis, having a dump-body, and having a power driven winch, including: an inverted substantially U-shaped frame having its legs pivoted to the rear of the chassis on lateral horizontal axis; a bail having its legs pivoted to the frame legs on lateral horizontal axis; a scoop swingably mounted between the bail legs; a cable attached to the winch and extending to the scoop; and training means for the cable whereby a single pull by the winch will first raise the scoop from a position of repose upon the ground behind the chassis, and will then swing the frame and scoop forwardly over the dump-body.

5. A loading attachment for motor vehicles having a chassis, having a dump-body, and having a power driven winch, including: an inverted substantially U-shaped frame having its legs pivoted to the rear of the chassis on lateral horizontal axis; a bail having its legs pivoted to the frame legs on lateral horizontal axis; a scoop swingably mounted between the bail legs; a cable attached to the winch and extending to said bail; and training means for the cable whereby a single pull by the winch will first simultaneously raise the frame, the scoop, and the bail from positions of repose upon said dump-body, and will thereafter swing the bail and the scoop rearwardly away from the frame and deposit the scoop upon the ground behind said chassis.

6. A loading attachment for motor vehicles having a chassis, having a dump-body, and having a pair of power driven winches, including: an inverted substantially U-shaped frame having its legs pivoted to the rear of the chassis on lateral horizontal axis; a bail having its legs pivoted to the frame legs on lateral horizontal axis; a scoop swingably mounted between the bail legs; a first cable attached to one of the winches and extending to the scoop; training means for said cable whereby a single pull by the winch will first raise the scoop from a position of repose upon the ground behind the chassis, and will then swing the frame and scoop forwardly over the dump body; a second cable attached to the other winch and extending to said bail; and training means for said second cable whereby a single pull by the winch will first simultaneously raise the frame, the scoop, and the bail from positions of repose upon said dump-body, and will thereafter swing the bail and the scoop rearwardly away from the frame and deposit the scoop upon the ground behind said chassis.

CLAY R. BEELER.

REFERENCES CITED

The following references are of record in the file of this patent:

UNITED STATES PATENTS

| Number | Name | Date |
| --- | --- | --- |
| 1,316,373 | McGrane | Sept. 16, 1919 |
| 1,378,631 | Stone | May 17, 1921 |
| 2,056,495 | Venema | Oct. 6, 1936 |
| 2,244,559 | Lawton | June 3, 1941 |
| 2,332,962 | Barrett | Oct. 26, 1943 |
| 2,387,687 | Smith | Oct. 23, 1945 |

FOREIGN PATENTS

| Number | Country | Date |
| --- | --- | --- |
| 555,206 | France | Mar. 17, 1923 |